(12) United States Patent
Blizzard et al.

(10) Patent No.: US 6,251,520 B1
(45) Date of Patent: Jun. 26, 2001

(54) METHOD FOR PRODUCING A SIZED COATED CERAMIC FIBER AND COATED FIBER

(75) Inventors: John Donald Blizzard, Bay City; Andrew Szweda; Gary Michael Wieber, both of Midland, all of MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/311,385

(22) Filed: May 13, 1999

Related U.S. Application Data

(63) Continuation of application No. 09/015,691, filed on Jan. 29, 1998, now abandoned.

(51) Int. Cl.$^7$ ..................................................... D02G 3/00
(52) U.S. Cl. .................. 428/375; 427/393.6; 427/407.1; 427/419.7; 427/518; 427/558; 427/559; 428/413; 428/418; 428/423.1; 428/425.8; 428/446; 428/457; 428/698; 428/704
(58) Field of Search ..................................... 427/518, 558, 427/559, 393.6, 407.1, 419.7; 428/375, 413, 418, 423.1, 425.8, 446, 457, 698, 704

(56) References Cited

U.S. PATENT DOCUMENTS

| | | | |
|---|---|---|---|
| 4,642,271 | 2/1987 | Rice | 428/698 |
| 4,853,021 | 8/1989 | Soszka et al. | 65/2 |
| 4,927,445 | 5/1990 | Soszka et al. | 65/11.1 |
| 5,049,407 | 9/1991 | Soszka et al. | 427/54.1 |
| 5,079,218 | 1/1992 | Tanaka et al. | 505/1 |
| 5,093,155 | 3/1992 | Miyazaki et al. | 427/177 |
| 5,130,194 | 7/1992 | Baker et al. | 428/367 |
| 5,173,367 | 12/1992 | Liimatta et al. | 428/408 |
| 5,196,235 | 3/1993 | Parlier et al. | 427/214 |
| 5,468,318 | 11/1995 | Leung et al. | 156/89 |
| 5,547,623 | 8/1996 | Barnard | 264/82 |
| 5,626,964 | 5/1997 | Blizzard et al. | 428/412 |

FOREIGN PATENT DOCUMENTS

| | | |
|---|---|---|
| 0 243 275 | 4/1987 | (EP) . |
| 0 273 812 | 12/1987 | (EP) . |
| 0 434 501 | 12/1990 | (EP) . |
| 361195188A * | 8/1986 | (JP) . |
| 410259309A * | 9/1998 | (JP) . |

* cited by examiner

Primary Examiner—Bernard Pianalto
(74) Attorney, Agent, or Firm—Sharon K. Severance

(57) ABSTRACT

A method for producing a sized, coated ceramic fiber decreases mechanical damage to the fiber during weaving, and the sizing can be removed after weaving by heating at a low temperature.

18 Claims, No Drawings

METHOD FOR PRODUCING A SIZED COATED CERAMIC FIBER AND COATED FIBER

This application is a continuation of application Ser. No. 09/015,691 filed on Jan. 29, 1998, which application is now abandoned.

This invention was made with United States Government support under Department of Defense Contract F33615-92-C-2279 awarded by the Department of Defense. The United States Government has certain rights in the invention.

FIELD OF THE INVENTION

This invention relates to a non-aqueous sizing for ceramic fibers. The sizing makes the fiber easier to handle, wind, and weave. This invention also relates to a method for producing a sized, coated ceramic fiber.

BACKGROUND OF THE INVENTION

Ceramic composite materials used in high temperature applications require the use of a ceramic fiber for reinforcement. Commercially available ceramic fibers are typically provided with a sizing on the fiber. Generally, any sizing is removed before coating the ceramic fiber with an interfacial coating. The resulting fiber is difficult to handle, filament wind, or weave into a 2-dimensional fabric or 3-dimensional pre-form. Additionally, an unsized fiber is prone to mechanical damage.

U.S. Pat. No. 5,093,155 issued to Miyazaki et al. on Mar. 3, 1992, discloses sizing liquid containing a sulfone compound and a solvent such as water or an organic solvent. The sizing is applied to fibers, including carbon, boron, ceramic, and metal fibers. The fibers are incorporated in a matrix resin to make a composite. The sizing enhances adhesion between the fibers and the matrix. U.S. Pat. No. 5,130,194 issued to Baker et al. on Jul. 14, 1992, discloses a coating for ceramic fibers used in composites. The fibers are generally coated with a silanol and a difunctional organic coupling agent in a water or alcohol solvent. The silanol provides hydroxyl groups on the fiber, and the coupling agent connects the hydroxyl binding sites to a resin to form a composite. However, aqueous sizing materials can damage coated fibers if the coating is moisture sensitive, resulting in deteriorated composite properties.

U.S. Pat. No. 5,173,367 issued to Liimatta et al. on Dec. 22, 1992, discloses a fiber reinforced ceramic composite. The fiber has a 2 layer size obtained by sizing the fibers with a solution of an organic solvent, a metal oxide, and a titanium compound. The fibers are then sized with an organic solvent solution of a polycarbosilane or polysilazane. The sizing protects the fibers from oxidative deterioration.

One object of the present invention is to provide a non-aqueous sizing for ceramic fibers that makes the fibers easier to handle, wind, and weave. Another object of the present invention is to provide a sizing that is easily removed by heat treatment at low temperature and leaves little or no residue when decomposed in an inert atmosphere. Another object of the present invention is to produce a sized fiber that is less prone to moisture and mechanical damage.

SUMMARY OF THE INVENTION

The present invention relates to a non-aqueous sizing composition that can be applied to small diameter ceramic fibers, such as silicon carbide and silicon oxycarbide fibers. The fibers may be coated with interfacial coatings. Some interfacial coatings are moisture-reactive. The sizing protects the fiber and interfacial coatings from moisture and mechanical damage during winding and weaving. The sizing can be removed in an inert environment at low temperature. A method for producing sized fibers is also disclosed.

DETAILED DESCRIPTION OF THE INVENTION

The present invention relates to a non-aqueous sizing composition for materials such as fibers, preferably ceramic fibers having interfacial coatings. The sizing composition comprises a sizing compound and a curing agent.

Suitable sizing compounds for the present invention are multifunctional acrylates or multifunctional methacrylates. Multifunctional acrylates have at least two acrylate groups per molecule. Multifunctional methacrylates have at least two methacrylate groups per molecule. The sizing compound can be a monomer or a polymer. The amount of the sizing compound in the non-aqueous sizing composition is typically 1 to 98%, preferably 12 to 38% by weight of the non-aqueous sizing composition.

Suitable multifunctional acrylates and multifunctional methacrylates for the sizing compound are exemplified by those disclosed in U.S. Pat. No. 5,626,964, which is hereby incorporated by reference for the purpose of providing examples of multifunctional acrylates and multifunctional methacrylates only.

Suitable multifunctional acrylate monomers include diacrylates, triacrylates, tetraacrylates, and pentaacrylates. Suitable diacrylates include:

1,6 hexanediol diacrylate,
1,4-butanediol diacrylate,
ethylene glycol diacrylate,
diethylene glycol diacrylate,
tetraethylene glycol diacrylate,
tripropylene glycol diacrylate,
neopentyl glycol diacrylate,
poly(butanediol) diacrylate,
1,3-butylene glycol diacrylate,
triethylene glycol diacrylate,
triisopryopylene glycol diacrylate, and
polyethylene glycol diacrylate.

Examples of suitable triacrylates include trimethylolpropane triacrylate, trimethylolpropane triethoxy triacrylate, and pentaerythritol monohydroxy triacrylate. Trimethylol propane triacrylate is preferred when the sizing compound is a multifunctional acrylate monomer.

Examples of suitable tetraacrylates include pentaerythritol tetraacrylate, and di-trimethylolpropane tetraacrylate. Suitable pentaacrylates include dipentaerythritol (monohydroxy) pentacrylate.

Suitable multifunctional methacrylate monomers include dimethacrylates, trimethacrylates, tetramethacrylates, and pentamethacrylates. Examples of suitable dimethacrylates include 1,4-butanediol dimethacrylate, tetraethylene glycol dimethacrylate, and Bisphenol A dimethacrylate. Examples of suitable trimethacrylates include trimethylolpropane trimethacrylate.

The sizing compound can also be a multifunctional acrylate polymer. Multifunctional acrylate polymers are selected from the group consisting of: epoxy acrylate polymers, urethane acrylate polymers, polyester acrylate polymers, and mixtures thereof.

Suitable epoxy acrylate polymers include Bisphenol A epoxy diacrylate, available from Sartomer Company, Inc. of Exton, Pa. Bisphenol A epoxy diacrylate is sold under the designation CN104. CN104 has a viscosity of 3,500 mPa s at 65° C. and a specific gravity of 1.15.

Suitable urethane acrylate polymers include hexafunctional aromatic urethane acrylate with an acrylated polyol diluent, which is available under the designation Ebecryl-220™. Ebecryl-220™ has a molecular weight of 1,000 and a viscosity of 28,000 mPa s at 25° C. Another suitable urethane acrylate is aliphatic urethane diacrylate, which is available under the designation Ebecryl-230™. Ebecryl-230™ has a molecular weight of 5,000 and a viscosity of 40,000 mPa s at 25° C. Both of these urethane acrylates are available from UCB Radcure, Inc. of Louisville, Ky.

Suitable polyester acrylate polymers include tetrafunctional polyester acrylate, which is available under the designation Ebecryl-80™ by UCB Radcure, Inc. of Louisville, Ky. Ebecryl-80™ has a molecular weight of 1,000 and a viscosity of 3,500 mPa s at 25° C.

Urethane acrylate polymers are preferred for the sizing compound of this invention. Ebecryl-220™ is particularly preferred.

The curing agent in the non-aqueous sizing composition is selected from the group consisting of ultra-violet photoinitiators and free radical initiators. Preferably, the curing agent is an ultra-violet photoinitiator.

When the curing agent is an ultra-violet photoinitiator, the amount present is 1 to 20%, preferably 2 to 8%, by weight of the non-aqueous sizing composition. The ultra-violet photoinitiator can be any compound that will start a reaction with the sizing compound when exposed to ultra-violet radiation. The ultra-violet photoinitiator must be compatible with the other ingredients of the composition. Compatibility can be determined by mixing about 1 weight percent of the ultra-violet photoinitiator with the other ingredients of the composition at room temperature. The photoinitiator is compatible if no precipitate forms. Another requirement for the photoinitiator is that it may not cause the composition to react in the absence of ultra-violet radiation.

Suitable compounds for the ultra-violet photoinitiator include benzophenone, acetonaphthone, acetophenone, benzoin methyl ether, benzoin isobutyl ether, 2-hydroxy-2-methyl-1-phenylpropan-1-one, 1-hydroxycyclohexylphenyl ketone, diethoxyacetophenone, hydroxypropylphenyl ketone, and hydroxypropylisopropylphenyl ketone. 2-Hydroxy-2-methyl-1-phenylpropan-1-one is preferred.

In an alternative embodiment of the invention, the curing agent may be a free radical initiator. When the curing agent is a free radical initiator, the amount present in the sizing composition is 1 to 20%, preferably 4 to 8% by weight of the composition. Suitable free radical initiators include peroxide compounds such as benzoyl peroxide and 2,4-dichlorobenzoyl peroxide; and vazo compounds such as azobisisobutyronitriles.

The non-aqueous sizing composition may also contain an optional dry solvent. Dry means that the solvent contains less than 200 ppm by weight of water, preferably less than 100 ppm by weight of water. Suitable solvents for the present invention include alcohols such as methyl, ethyl, isopropyl, and t-butyl; aromatic hydrocarbons such as benzene, toluene, and xylene; aliphatic hydrocarbons such as heptane, hexane, and octane; glycol ethers such as propylene glycol methyl ether, dipropylene glycol, methyl ether, propylene glycol n-butyl ether, propylene glycol n-propyl ether, and ethylene glycol n-butyl ether; and halogenated hydrocarbons such as 1,1,1-trichloroethane and methylene chloride. Toluene and isopropyl alcohol are preferred. The amount of solvent in the curable sizing composition is up to 98%, preferably 1 to 98%, and more preferably 60 to 80% by weight.

The present invention also relates to a method of producing a sized fiber, wherein the method comprises applying the non-aqueous sizing composition to a fiber and thereafter curing the sizing compound to form a sized fiber. If the sizing composition contains a solvent, the solvent may be removed after applying the non-aqueous sizing composition to the fiber and before curing the sizing compound.

The fibers of the present invention are not specifically restricted. Suitable fibers for this invention include, but are not limited to: optical fibers, glass fibers, textiles, and ceramic fibers. Ceramic fibers are preferable. Ceramic fibers are useful in composites, such as resin matrix, metal matrix, and ceramic matrix composites; and such fibers are known in the art. Examples of suitable ceramic fibers include silicon carbide fibers, fibers comprising silicon carbide deposited on a carbon core, alumina-boria-silica fibers, $Al_2O_3$ fibers, $SiO_2$ fibers, $Al_2O_3$—$SiO_2$ fibers, silicon carbide fibers containing titanium, silicon oxycarbonitride fibers, silicon nitride fibers, and $Al_2O_3$—$ZrO_2$ fibers. Preferably, the ceramic fibers are silicon oxycarbonitride fibers.

Methods for preparing ceramic fibers derived from hydridopolysilazanes are known in the art. For example, U.S. Pat. No. 5,547,623 hereby incorporated by reference, discloses a method of preparing ceramic fibers from a hydridopolysilazanes resin by melt spinning the resin into a fiber, curing the outer surface of the fiber, and continuously pyrolyzing the fiber. Methods for preparing the ceramic fiber are not specifically restricted.

Commercially available fibers may be supplied with a surface sizing. Preferably, the sizing is removed, and an interfacial coating is applied to the fibers. The interfacial coating improves strength and toughness of a composite made from the fibers and a matrix. The interfacial coating on the ceramic fibers is exemplified by carbon, boron nitride, silicon carbide, silicon nitride, and mixtures thereof. The fibers are preferably coated with boron nitride. Some interfacial coatings react with water, therefore, the sizing composition must be non-aqueous.

Methods for coating the fibers with interfacial coatings are known in the art and are not critical. For example, fibers may be coated by vapor deposition of borazine at temperatures less than 1000° C. This process is disclosed in U.S. Pat. No. 4,642,271, hereby incorporated by reference. The amount of coating depends on the type and diameter of the fibers, however, the amount of coating on the fiber is preferably 0.1 to 0.7 micrometers in thickness. The coated ceramic fibers used in the present invention typically have diameter of 9 to 20 microns, preferably 15 to 20 microns. The coated ceramic fibers also typically have a fineness of 900 to 1800 g per 9000 m.

The sizing composition may be applied to the coated ceramic fibers by dipping, spraying, roll coating, extruding, pultrusion, or vapor deposition. Preferably, the composition is applied to the coated fibers continuously. When the curable sizing composition is applied continuously, the composition is typically applied at a rate of 0.5 to 2.0, preferably 0.8 to 1.5 grams per minute.

If solvent is present in the non-aqueous sizing composition, the solvent is removed after the non-aqueous sizing composition is applied to the fiber and before curing the sizing compound. The solvent may be removed by heating the fiber to evaporate the solvent, allowing the solvent to evaporate at ambient temperature and pressure or by subjecting the fiber to vacuum. When the solvent is removed by heating, the temperature will vary depending on the solvent and type of fiber used. Ceramic fibers are preferably heated to a temperature up to 100° C. when the solvent is toluene. However, the temperature to which the fiber is heated must be less than the boiling point of the solvent. The solvent is preferably removed continuously, for example, by passing the fiber through a heater, such as a tube furnace. The time required to remove the solvent will vary depending on the temperature and the solvent, however, the time required is typically several seconds to several hours, preferably 10 to 20 seconds.

The sizing compound is then cured to form a sized, coated fiber. When the curing agent is an ultra-violet photoinitiator, the sizing compound cures by exposure to ultra-violet radiation. Sources of ultra-violet radiation are well known in the art, and are not critical. For example, the ultra-violet radiation source may be a mercury lamp such as a Colight Model UV-6™. The intensity of the ultra-violet radiation required to cure the sizing compound is 100 to 4,000, preferably 300 to 2,000, mJ/cm$^2$. The time required to cure the sizing compound is speed dependent. Typically the time required to cure the sizing compound is 0.01 to 10, preferably 0.5 to 5 seconds at 0.3 m/s.

When the curing agent is a free radical initiator, the sizing compound cures by heating. The temperature required to cure the sizing compound depends on the free radical initiator and the type of fiber used. Typically, the temperature required is up to 400° C. When the free radical initiator is benzoyl peroxide, the temperature is typically up to 120° C., preferably 100 to 120° C. When the free radical initiator is an azobisisobutyronitrile, the temperature is typically 120 to 400° C., preferably 150 to 250° C. The time required to cure the sizing compound is speed dependent. Typically the time required to cure the sizing compound is 0.1 to 30 seconds, preferably 1 to 20 seconds, at 0.3 m/s.

The resulting sized, coated fibers are preferably collected continuously. For example, the fibers may be wound onto a spool using a Kamitsu™ fiber winder. Typically, the fiber is collected at a rate up to 0.3 m/s.

The sized fibers may then be woven into a desired shape, for example, two-dimensional fabrics and three-dimensional pre-forms. After weaving, the sizing may be removed by heating at a relatively low temperature (less than 500° C.) under an inert atmosphere. The inert atmosphere preferably comprises argon or nitrogen, where inert is defined as containing less than 500 ppm oxygen. Heating under an inert atmosphere leaves little or no residue on the fiber. Char yield is the weight percent of residue remaining on the fiber after heating. Typically, char yield is 5% by weight, or less. Preferably, char yield is less than 1% by weight with no carbon and no other reactive species, such as sulfides, metals, and nitrides.

EXAMPLES

These examples are intended to illustrate the invention to those skilled in the art and should not be interpreted as limiting the scope of the invention set forth in the claims. In the following examples, BN means boron nitride, and SiC means silicon carbide.

Comparative Example

Two mixtures were evaluated for use as non-aqueous sizing compositions. The ingredients of Comparative Mixtures 1 and 2 are summarized in Table 1.

Thermogravimetric analysis was carried out on each mixture by heating the mixture in flowing nitrogen to 1200° C. Weight loss and char yield for each mixture are reported in Table 2. Char yield was greater than 5% for both mixtures.

Example

Two mixtures were evaluated for use as non-aqueous sizing compositions. The ingredients of the Mixtures 1 and 2 are summarized in Table 1.

Thermogravimetric analysis was carried out on each of the mixtures by heating the mixture in flowing nitrogen to 1200° C. Weight loss and char yield for each mixture are reported in Table 2. Both mixtures had char yields of less than 5%.

TABLE 1

| Components | Comparative Mixture 1 | Comparative Mixture 2 | Mixture 1 | Mixture 2 |
| --- | --- | --- | --- | --- |
| 50% acrylate silica silane | 5 g | — | — | — |
| tetraethyl orthosilicate | — | 5 g | — | — |
| trimethylolpropane tri-acrylate | — | — | 5 g | — |
| urethane acrylate* | — | — | — | 5 g |
| photoiniator | 0.2 g | 0.2 g | 0.2 g | 0.2 g |
| isopropanol | 25 g | — | 25 g | — |
| toluene | — | 25 g | — | 25 g |

*The urethane acrylate used was Ebecryl-220 ™.

TABLE 2

| Mixture | % Weight Loss, Maximum | Temperature at which Max Weight Loss Ocurred ° C. | Char Yield % |
| --- | --- | --- | --- |
| Comparative 1 | 65% | 442° C. | 35% |
| Comparative 2 | 84% | 468° C. | 15% |
| 1 | 97% | 450° C. | 3% |
| 2 | 100% | 390° C. | ≦1% |

Example 2

Mixture 2 from Table 1 was then applied to a boron nitride coated silicon oxycarbonitride fiber tow (1000 g per 9000 m) according to the following continuous method:

The coated fiber, wound on a spool, was threaded through a sizing applicator. A 17% concentration of Mixture 2 was pumped to the sizing applicator by a peristaltic pump at a rate sufficient to apply 0.8 g per minute of sizing to the fiber. The fiber passed through a tube furnace at 100° C. to remove the toluene. The fiber then passed through an ultra-violet unit (Colight™ Model UV-6, 300 Watt setting) to cure the coating. The fiber was then wound on a cardboard spool using a Kamitsu fiber winder at a speed of 0.3 m per second.

The sized coated fiber was successfully woven into a three-dimensional pre-form that was further processed into a ceramic matrix composite.

This process was then repeated to size boron nitride coated silicon carbide fiber tow (1800 denier) instead of the boron nitride coated silicon oxycarbonitride fiber tow. The sized coated silicon carbide fiber tow was successfully used for filament winding of composite tubes.

We claim:

1. A method of producing a sized ceramic fiber, wherein the method comprises the steps of:
   1) applying to a ceramic fiber selected from silicon carbide fibers, silicon oxycarbide fibers, silicon oxynitride fibers, silicon carbide fibers containing titanium, silicon oxycarbonitride fibers, and silicon nitride fibers; a non-aqueous sizing composition consisting essentially of
- (a) 1 to 98% by weight of a sizing compound selected from the group consisting of multifunctional acrylate monomers, multifunctional methacrylate monomers and multifunctional acrylate polymers;
- (b) 1 to 20% by weight of a curing agent selected from the group consisting of ultra-violet photoinitiators and free-radical initiators; and
- (c) 1 to 98% by weight of a dry solvent; and 2) curing the sizing compound to form a sized ceramic fiber.

2. A sized ceramic fiber prepared by the method of claim 1.

3. The method of claim 1, wherein the ceramic fiber is coated with an interfacial coating before the composition is applied.

4. The method of claim 3, wherein the interfacial coating comprises boron nitride.

5. The method of claim 1, wherein ingredient (a) is present at 12 to 38% by weight of the composition.

6. The method of claim 1, wherein ingredient (a) is a multifunctional acrylate monomer selected from the group consisting of diacrylates, triacrylates, tetraacrylates, and pentaacrylates.

7. The method of claim 6, wherein the multifunctional acrylate monomer is trimethylolpropane triacrylate.

8. The method of claim 1, wherein ingredient (a) is a multifunctional acrylate polymer selected from the group consisting of epoxy acrylate polymers, urethane acrylate polymers, polyester acrylate polymers, and mixtures thereof.

9. The method of claim 8, wherein the multifunctional acrylate polymer is hexafunctional aromatic urethane acrylate with an acrylated polyol diluent.

10. The method of claim 1, wherein ingredient (b) is an ultra-violet photoinitiator selected from the group consisting of benzophenone, acetonaphthone, acetophenone, benzoin methyl ether, benzoin isobutyl ether, 2-hydroxy-2-methyl1-phenylpropan-1-one, 1-hydroxycyclohexylphenyl ketone, diethoxyacetophenone, hydroxypropylphenyl ketone, and hydroxypropylisopropylphenyl ketone.

11. The method of claim 10, wherein the ultra-violet photoinitiator is 2-hydroxy-2-methyl-1-phenylpropan-1-one present at 2 to 8% by weight of the composition.

12. The method of claim 1, wherein the curing agent is an ultra-violet photoinitiator and the sizing compound cures by exposure ultra-violet radiation with an intensity of 100 to 4000 $mJ/cm^2$.

13. The method of claim 1, wherein the solvent is removed after the composition is applied to the ceramic fiber and before the sizing compound is cured.

14. The method of claim 13, wherein the solvent is toluene, and it is removed by heating to a temperature up to 100° C.

15. The method of claim 1, wherein the non-aqueous sizing composition is applied to the ceramic fiber by a method selected from the group consisting of dipping, spraying, roll coating, extruding, pultrusion, and vapor deposition.

16. The method of claim 1, further comprising 3) heating the sized ceramic fiber to a temperature up to 500° C. under an inert atmosphere to remove the sizing.

17. The method of claim 16, wherein the sizing compound, curing agent, and solvent are selected such that char yield after heating is up to 5% by weight based on the weight of sizing compound applied to the fiber.

18. The method of claim 17, wherein the char yield is ≦1% by weight.

* * * * *